United States Patent
Chen et al.

(10) Patent No.: US 7,397,740 B2
(45) Date of Patent: Jul. 8, 2008

(54) METHOD AND RECORDING DEVICE CAPABLE OF SELECTING A WRITE STRATEGY APPLIED TO AN OPTICAL DISC

(75) Inventors: Chia-Chung Chen, Taipei Hsien (TW); Chih-Ching Yu, Tao-Yuan Hsien (TW)

(73) Assignee: Mediatek Incorporation, Hsin-Chu Hsien (TW)

( * ) Notice: Subject to any disclaimer, the term of this patent is extended or adjusted under 35 U.S.C. 154(b) by 627 days.

(21) Appl. No.: 10/904,759

(22) Filed: Nov. 26, 2004

(65) Prior Publication Data

US 2006/0114780 A1 Jun. 1, 2006

(51) Int. Cl.
*G11B 7/00* (2006.01)

(52) U.S. Cl. .................................... 369/47.53

(58) Field of Classification Search ............... 369/47.5, 369/47.51, 47.52, 47.53, 116, 47.27, 120, 369/47.1, 47.54
See application file for complete search history.

(56) References Cited

U.S. PATENT DOCUMENTS

| | | | |
|---|---|---|---|
| 6,646,965 B1 | 11/2003 | Kim | |
| 6,912,188 B2 * | 6/2005 | Morishima | 369/47.53 |
| 7,038,982 B2 * | 5/2006 | Schreurs et al. | 369/47.53 |
| 7,068,579 B2 * | 6/2006 | Tasaka et al. | 369/59.24 |
| 7,190,659 B2 * | 3/2007 | Usami | 369/116 |
| 7,254,102 B2 * | 8/2007 | Ohgake | 369/47.55 |
| 7,277,369 B2 * | 10/2007 | Murata et al. | 369/47.53 |
| 2003/0058765 A1 | 3/2003 | Schreurs et al. | |

FOREIGN PATENT DOCUMENTS

WO  WO 03/075265 A2  9/2003

* cited by examiner

*Primary Examiner*—Nabil Z Hindi
(74) *Attorney, Agent, or Firm*—Winston Hsu

(57) ABSTRACT

A method and a recording device capable of selecting a preferred write strategy from a plurality of write strategies for an optical disc. The optical disc contains a characteristic value. The method includes: reading the characteristic value from the optical disc; selecting a first write strategy from the write strategies to be an active test write strategy according to the characteristic value of the optical disc; writing a test pattern onto the optical disc according to the active test write strategy; and reading the written test pattern from the optical disc, checking if the written test pattern satisfies a corresponding criterion, and utilizing the active test write strategy to be the preferred write strategy if the written test pattern satisfies the corresponding criterion.

36 Claims, 2 Drawing Sheets

METHOD AND RECORDING DEVICE CAPABLE OF SELECTING A WRITE STRATEGY APPLIED TO AN OPTICAL DISC

BACKGROUND

The present invention relates to a recording device capable of writing data onto a recordable optical disc, and more specifically, to a method and a recording device capable of selecting a write strategy for recording data onto a recordable optical disc according to a characteristic value which is pre-grooved on the recordable optical disc.

In today's information technology era, optical recording products used for storing a large amount of information have become popular. There are various kinds of recordable optical discs utilized to store data, such as CD-R discs, CD-RW discs, DVD-R discs, DVD+R discs, DVD-RW, DVD+RW discs, DVD-RAM discs, etc. Although complying with recordable optical disc specification, discs produced by different manufacturers and composed of different materials may behave differently when exposed to the write pulse generated by different optical recording products. Therefore, such differences among the optical discs may result in different recording qualities of the same stored data. The recording qualities could be evaluated using various criteria, for example, jitter or bit error rate. Therefore, in order to solve the above-mentioned problem caused by variances between the discs' characteristics, a recording device has to choose an appropriate write strategy for each different kind of optical discs, respectively. In this way, optimal recording quality could be achieved.

Generally speaking, when a recording device according to the related art is going to record data onto an optical disc whose preferred write strategy is unknown, the recording device just adopts a default write strategy to write data onto the optical disc. Such recording process may lead to bad recording quality if the default write strategy is not appropriate for this specific kind of discs. Therefore, U.S. Patent Application Publication NO. US2003/0058765A1 "Method and recording device for selecting an optimized write strategy and recording medium for use by the method" has disclosed a method for selecting an optimal write strategy for a specific type of optical recording disc from a set of write strategies stored in a recording device. However, the above method consumes a large amount of time to write a plurality of test patterns respectively according to all the presently stored write strategies, and then selects an optimal write strategy based on the performance results of written test patterns on the optical disc. As a result, the write strategy selection is very time-consuming, which degrades the performance of the recording device.

SUMMARY

One of the objectives of the claimed invention is therefore to provide a method and a recording device capable of selecting a write strategy for an optical disc through a classification mechanism to solve the above-mentioned problem.

According to the claimed invention, a method for selecting a preferred write strategy for an optical disc from a plurality of write strategies is disclosed. The optical disc contains a characteristic value. The method comprises: reading the characteristic value from the optical disc; selecting a first write strategy from the write strategies to be an active test write strategy according to the characteristic value of the optical disc; writing a test pattern onto the optical disc according to the active test write strategy; and reading the written test pattern from the optical disc, checking if the written test pattern satisfies a corresponding criterion, and utilizing the active test write strategy to be the preferred write strategy if the written test pattern satisfies the corresponding criterion.

In addition, the claimed invention provides a recording device for selecting a preferred write strategy for an optical disc. The optical disc contains a characteristic value indicating manufacturer information or material information of the optical disc. The recording device comprises: a reading/writing circuit coupled to read the characteristic value of the optical disc; and a controller coupled to the reading/writing circuit for selecting a first set of write strategies according to the characteristic value, and determining the preferred write strategy by evaluating actual writing quality of the write strategies included in the first set of write strategies.

According to the present invention, various write strategies are classified into a plurality of write strategy sets according to the characteristic values corresponding to a plurality of optical discs. The characteristic value includes the disc manufacturer information and the disc material information. The characteristic value is used as a reference for a preferred write strategy selection. With the characteristic value as a reference, the recording device spends less time on writing test patterns and examining the recording quality of these written test patterns to select a preferred write strategy for the current disc. The performance of the recording device is greatly improved by the present invention.

These and other objectives of the present invention will no doubt become obvious to those of ordinary skill in the art after reading the following detailed description of the preferred embodiment that is illustrated in the various figures and drawings.

DETAILED DESCRIPTION

When a recordable optical disc is manufactured, some pre-grooved data are also formed on the recordable optical disc. The pre-grooved data may include manufacturer information, material information, and other information (for example, write strategy related information), . . . etc, according to the recordable optical disc specification (for example, CD-R/RW, DVD-R/RW, or DVD+R/RW . . . ). The manufacturer information indicates the manufacturer of the recordable optical disc, the material information indicates the material forming the recording layer(s) of the recordable optical disc, and the write strategy related information describes a suggested write strategy of the recordable optical disc provided by the disc manufacturer. Ideally the write strategy related information would illustrate a write strategy for the recording device to use. However, due to the components variation among different recording devices, the write strategy related information is sometimes not applicable for selecting a preferred write strategy. Illustratively, for DVD+R/RW discs, the manufacturer information includes the Disc Manufacturer ID (byte 19 to 26), and Media Type ID (bytes 27 to 29); the write strategy related information includes bytes 32 to 55. Also illustratively, for CD-R/RW discs, the material information includes the partial start time of the Lead-in area. More details of the DVD+R/RW discs and CD-R/RW discs could be referred to the specification, "DVD+R 4.7 Gbytes Basic format Specifications Version 1.0 (January, 2002)" and "Recordable Compact Disc Systems, PART2:CD-R Version 3.1 (December 1998)."

In the following description a characteristic value is defined as including at least a portion of the pre-grooved data, and is capable of identifying the manufacturer and material of the recordable optical disc. As an example, for DVD+R/RW discs, the characteristic value CV includes the Disc Manufacturer ID, the Media Type ID, and the Product Revision Number. As another example, for CD-R/RW discs, the characteristic value CV includes the start time of the Lead-in and the Lead-out area. U.S. Pat. No. 6,646,965 and WO 03075265 A2 disclose methods and apparatuses for identifying the recordable optical discs, and could be referred to as references.

Figure 1:
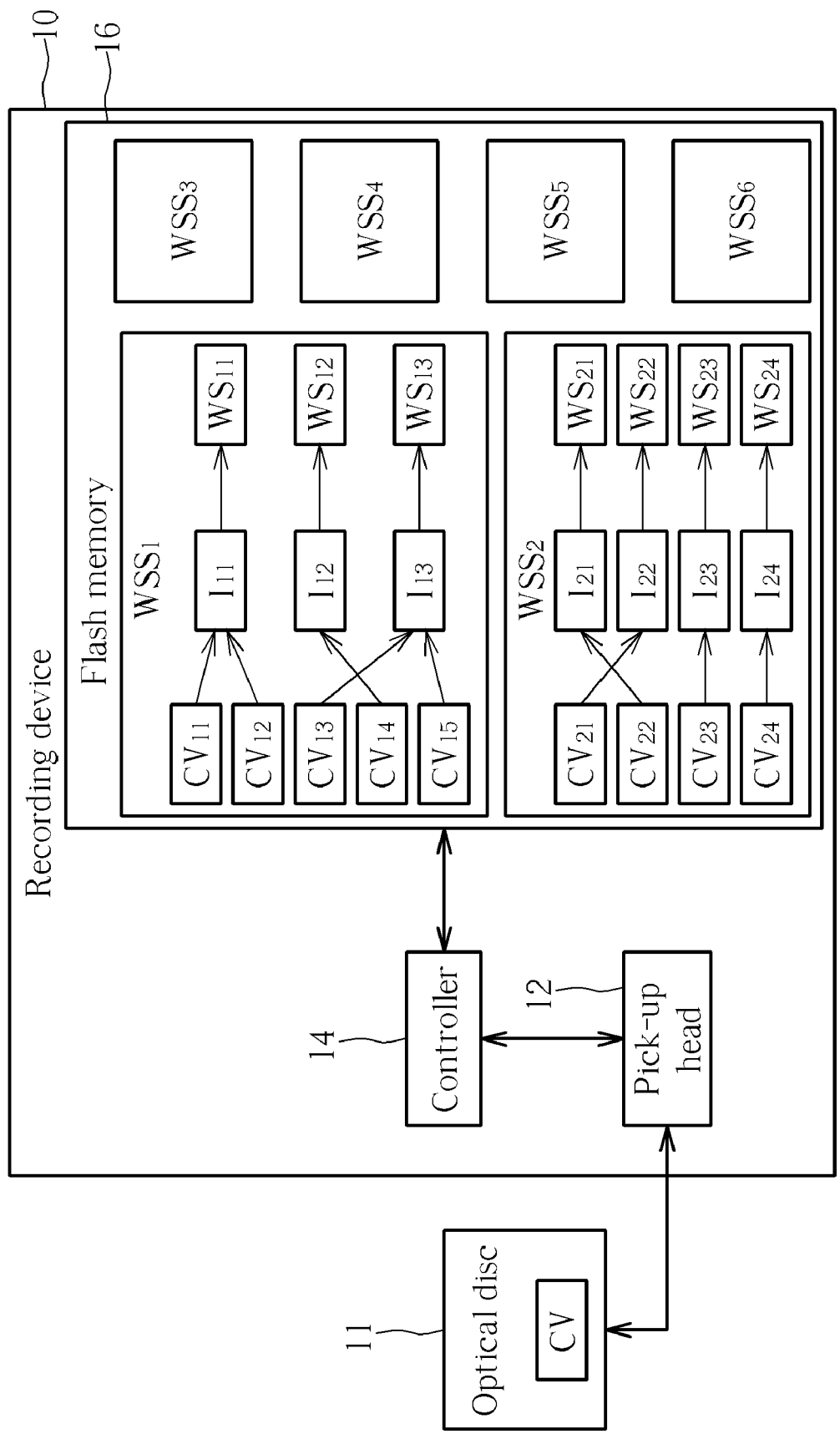
FIG. 1 is a block diagram of a recording device according to an embodiment of the present invention.

FIG. 1 is a block diagram of a recording device 10 according to an embodiment of the present invention. In this embodiment, the recording device 10 is an optical disc drive such as a DVD+R drive. After a recordable optical disc 11 (e.g. a DVD+R disc) acting as an information carrier is inserted into the recording device 10, the recording device 10 starts selecting a preferred write strategy for the optical disc 11 from a plurality of write strategies pre-stored in the recording device 10. As shown in FIG. 1, the recording device 10 includes a pick-up head 12, a controller 14 and a flash memory 16. In the present embodiment, the pick-up head 12 acts as a reading/writing circuit for writing data onto the optical disc 11 and reading data stored on the optical disc 11. The flash memory 16 stores a plurality of write strategies. The controller 14 is capable of driving the pick-up head 12 to read the characteristic value CV of the optical disc 11 and write test patterns onto the optical disc 11.

The flash memory 16 acts as a non-volatile storage unit for storing write strategy data. Please note that other types of non-volatile memories could be utilized in the place of the flash memory 16 for functioning as the required storage unit. In the present embodiment, there are a plurality of write strategies ($WS_{11}$-$WS_{13}$, $WS_{21}$-$WS_{24}$) and corresponding characteristic values ($CV_{11}$-$CV_{15}$, $CV_{21}$-$CV_{24}$) stored in the flash memory 16. The write strategies $WS_{11}$-$WS_{13}$, $WS_{21}$-$WS_{24}$ are divided into six write strategy sets, $WSS_1$-$WSS_6$, according to the characteristic values. For example, in the present embodiment, the characteristic values $CV_{11}$-$CV_{15}$ indicate a same manufacturer, so the write strategies $WS_{11}$-$WS_{13}$ respectively corresponding to the characteristic values $CV_{11}$-$CV_{15}$ are grouped into the write strategy set $WSS_1$. Indexes $I_{11}$-$I_{13}$ represent the write strategies $WS_{11}$-$WS_{13}$, respectively. The characteristic values $CV_{21}$-$CV_{24}$ indicate same material of the recording layer(s), so the write strategies $WS_{21}$-$WS_{24}$ respectively corresponding to the characteristic values $CV_{21}$-$CV_{24}$ are grouped into the write strategy set $WSS_2$. Indexes $I_{21}$-$I_{24}$ represent the write strategies $WS_{21}$-$WS_{24}$, respectively. In the same manner, which write strategies are grouped into the write strategy sets $WSS_3$, $WSS_4$, $WSS_5$, or $WSS_6$ can be determined. It is possible that one write strategy is suitable for recordable optical discs with different characteristic values. For example, the write strategy $WS_{11}$ could be used to record data on recordable optical discs having characteristic values $CV_{11}$ or $CV_{12}$.

Operation of the write strategy selection is further described in the following.

Figure 2:
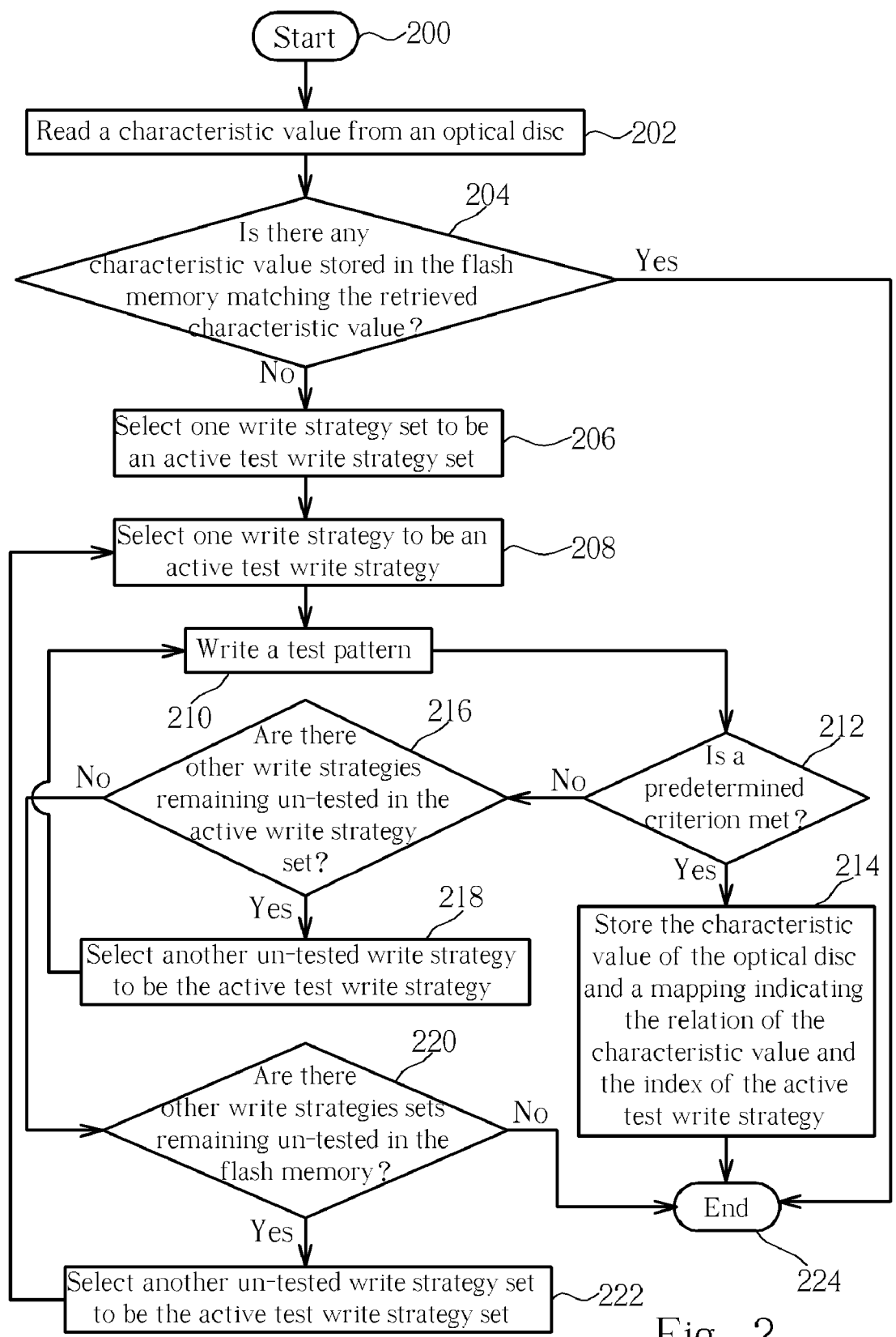
FIG. 2 is a flowchart illustrating operation of a write strategy selection performed by the recording device shown in FIG. 1.

FIG. 2 is a flowchart illustrating operation of a write strategy selection performed by the recording device 10 shown in FIG. 1. The write strategy selection includes the following steps:

Step 200: Start.

Step 202: The controller 14 drives the pick-up head 12 to read a characteristic value CV stored in the optical disc 11.

Step 204: The controller 14 searches the flash memory 16 for a characteristic value which is matching the characteristic value CV of the optical disc 11. If the controller 14 detects that a same characteristic value CV has been stored in the flash memory 16, go to step 224; otherwise, go to step 206.

Step 206: The controller 14 selects one write strategy set from the stored write strategy sets to be an active test write strategy set according to the characteristic value CV read from the optical disc 11.

Step 208: The controller 14 selects one write strategy from the write strategies included in the active test write strategy set to be an active test write strategy.

Step 210: The controller 14 drives the pick-up head 12 to write a test pattern onto the optical disc 11 according to the active test write strategy.

Step 212: The controller 14 drives the pick-up head 12 to read the written test pattern from the optical disc 11, and checks if the written test pattern satisfies a predetermined criterion. If the written test pattern satisfies the predetermined criterion, go to step 214; otherwise, go to step 216.

Step 214: The controller 14 stores the characteristic value CV of the optical disc 11, and a mapping indicating the relation of the characteristic value CV and the index of the active test write strategy, into the flash memory 16; go to step 224.

Step 216: The controller 14 determines whether there are other write strategies remaining un-tested in the active write strategy set. If there's no un-tested write strategy in the active write strategy set, go to step 220; otherwise, go to step 218.

Step 218: The controller 14 selects another un-tested write strategy from the write strategies included in the active test write strategy set to be the active test write strategy; go to step 210.

Step 220: The controller 14 determines whether there are other write strategies sets remaining un-tested in the flash memory 16. If there's no un-tested write strategy set in the flash memory 16, go to step 224; otherwise, go to step 222.

Step 222: The controller 14 selects another un-tested write strategy set from the stored write strategy sets to be the active test write strategy set; go to step 208.

Step 224: End.

Please refer to FIG. 2 together with FIG. 1. A more detailed description of selecting a preferred write strategy is illustrated as follows. After the recordable optical disc 11 is inserted for recording data (hereinafter called a "current disc"), the recording device 10 begins the write strategy selection for selecting a preferred write strategy for the current disc 11 (step 200). The controller 14 drives the pick-up head 12 to read the characteristic value CV stored in the current disc 11 (step 202). Next, the controller 14 searches the flash memory 16 to check if there is any characteristic value stored in the flash memory 16 matching the retrieved characteristic value CV (step 204). If there is a match, it indicates that a preferred write strategy corresponding to the current disc 11 has been previously determined and stored in the flash memory 16. For example, the search result shows that the characteristic value CV matches the characteristic value $CV_{13}$, which means the write strategy $WS_{13}$ is the preferred write strategy. Hence, the controller 14 could easily locate and use the preferred write strategy (the write strategy $WS_{13}$ in the example) for writing data onto the current disc 11, and the operation of finding the preferred write strategy is ended (step 224). If the search does not lead to a match, this means that no preferred write strategy corresponding to the current disc 11 is stored in the flash memory 16, and therefore the controller 14 needs to select a preferred write strategy for the current disc 11.

Assume the characteristic value CV of the current disc 11 and the write strategies $WS_{11}$-$WS_{13}$ indicates a same manufacturer, the write strategy set $WSS_1$ is configured to be an active test write strategy set (step 206). Next, the controller 14 selects one write strategy, such as the write strategy $WS_{11}$, from the active test write strategy set $WSS_1$ to be an active test write strategy (step 208). Then, the controller 14 drives the pick-up head 12 to write a test pattern onto the optical disc 11 according to the active test write strategy $WS_{11}$ (step 210). After finishing writing the test pattern, the controller 14 drives the pick-up head 12 to read the written test pattern from the optical disc 11 and checks if the written test pattern satisfies a predetermined criterion (step 212). For example, in an embodiment, the predetermined criterion could be a bit error rate (BER) being less than a predetermined value or a jitter being less than a predetermined degree. If the check result shows that the predetermined criterion is satisfied, it indicates that the controller 14 has successfully located a preferred write strategy for the current disc 11. Then, the controller 14 stores the characteristic value CV of the current disc 11, together with a mapping indicating the relation between the characteristic value CV of the current disc 11 and the index $I_{11}$ of the active test write strategy $WS_{11}$, into the flash memory 16 (step 214). Afterwards, the operation of the write strategy selection is terminated accordingly (step 224).

Alternatively, if the check result in step 212 shows that the predetermined criterion is not satisfied, the controller 14 checks whether there are other write strategies in the active test write strategy set $WSS_1$ remaining untested (step 216). If the determination result in step 216 indicates that there are still other write strategies in the active test write strategy set $WSS_1$ remaining untested, the controller 14 selects another write strategy in the active test write strategy set $WSS_1$, such as the write strategy $WS_{12}$, to be the active test write strategy (step 218). The flow then returns to the above-mentioned step 210. If the determination result in step 216 indicates that all write strategies in the active test write strategy set $WSS_1$ have already been tested, the controller 14 proceeds to determine if there are other test write strategy sets remaining untested (step 220). If the determination result in step 220 shows that all write strategy sets have already been tested, the controller 14 ends the operation of write strategy selection, and uses a default write strategy for the optical disc 11 similar to the related art (step 224). Otherwise, the controller 14 selects another write strategy set, such as the write strategy set $WSS_2$, to be the active test write strategy set (step 222), and then returns to perform the above-mentioned step 208.

In another embodiment, after the controller 14 selects a write strategy set $WSS_1$ from the stored write strategy sets $WSS_1$-$WSS_6$ to be an active test write strategy set $WSS_1$ according to the characteristic value CV read from the recordable optical disc 11, the controller 14 drives the pick-up head 12 to write a plurality of test patterns onto the optical disc 11 according to the write strategies $WS_{11}$-$WS_{13}$ included in the active test write strategy set $WSS_1$, respectively. Next, the controller 14 drives the pick-up head 12 to read the written test patterns from the optical disc 11. The controller 14 selects an optimal written test pattern according to a predetermined criterion (for example, the bit error rate and/or the jitter being less than a predetermined threshold). Then, the write strategy (for example, $WS_{12}$) corresponding to the optimal written test pattern is selected to be the preferred write strategy. The controller 14 stores the characteristic value CV of the current disc 11, as well as a mapping indicating the relation between the characteristic value CV of the current disc 11 and the index $I_{12}$ of the test write strategy $WS_{12}$, into the flash memory 16.

In still another embodiment, if none of the test patterns written according to the write strategies $WS_{11}$-$WS_{13}$ in the active test write strategy set $WSS_1$ meets the predetermined criterion, the controller 14 further selects another write strategy set $WSS_2$ from the write strategy sets $WSS_1$-$WSS_6$ to be a new active test write strategy set $WSS_2$ according to the characteristic value CV read from the current disc 11. The controller 14 drives the pick-up head 12 to write a plurality of test patterns onto the current disc 11 according to the write strategies $WS_{21}$-$WS_{24}$ in the active test write strategy set $WSS_2$. The remaining flow of the write strategy selection is not depicted because it is similar to the above-mentioned description. As a result, the controller 14 is capable of selecting an appropriate write strategy for the inserted optical disc 11.

In still another embodiment, the controller 14 determines the priorities of the write strategy sets, and the priorities of the write strategies within each write strategy set, according to the characteristic value CV read from the recordable optical disc 11. Such procedure may further reduce the time spent for locating the preferred write strategy.

In the above embodiments, various write strategies are classified into a plurality of write strategy sets according to the characteristic values corresponding to a plurality of optical discs. The characteristic value includes the disc manufacturer information and the disc material information. The characteristic value is used as a reference for a preferred write strategy selection. With the characteristic value as a reference, the recording device spends less time on writing test patterns and examining the recording quality of these written test patterns to select a preferred write strategy for the current disc. The performance of the recording device is greatly improved by the present invention.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A recording device for selecting a preferred write strategy for an optical disc from a plurality of write strategies, the optical disc containing a characteristic value indicating manufacturer information or material information of the optical disc, the recording device comprising:
   a reading/writing circuit coupled to read the characteristic value of the optical disc; and
   a controller coupled to the reading/writing circuit for selecting a first set of write strategies from a plurality of sets of write strategies according to the characteristic value, and determining the preferred write strategy by evaluating actual writing quality of the write strategies included in the first set of write strategies;
   wherein the plurality of write strategies are divided into the plurality of sets of write strategies according to a plurality of characteristic values corresponding to a plurality of optical discs.

2. The recording device of claim 1, wherein the evaluating actual writing quality is performed by writing a test pattern onto the optical disc, reading the test pattern written on the optical disc, and obtaining bit error rate information or jitter information of the written test pattern.

3. The recording device of claim 1, wherein if the actual writing quality does not meet a predetermined criterion, the controller further selecting a second set of write strategies according to the characteristic value, and determining the preferred write strategy by evaluating actual writing quality of the write strategies included in the second set of write strategies.

4. The recording device of claim 1, further comprising a non-volatile memory coupled to the controller for storing the first set of write strategies.

5. The recording device of claim 1, wherein the non-volatile memory further stores the relationship between the preferred write strategy and the characteristic value, thereby the recording device can use the preferred write strategy for writing data onto another optical disc having a same characteristic value without the need of selecting the first set of write strategies and evaluating actual writing quality of the write strategies included in the first set of write strategies.

6. A recording device for selecting a preferred write strategy for an optical disc, the optical disc containing a characteristic value indicating manufacturer information or material information of the optical disc; the recording device comprising:
- a non-volatile memory for storing a plurality of write strategies, wherein the plurality of write strategies are divided into a plurality of write strategy sets according to a plurality of characteristic values corresponding to a plurality of optical discs;
- a reading/writing circuit for reading the characteristic value of the optical disc; and
- a controller coupled to the reading/writing circuit for selecting a plurality of candidate write strategies included in a first write strategy set of the plurality of write strategy sets according to the characteristic value, driving the reading/writing circuit to write a test pattern onto the optical disc according to each of the plurality of candidate write strategies, evaluating writing quality of the test patterns, and selecting the preferred write strategy according to the writing quality of the test patterns.

7. A method for selecting a preferred write strategy for an optical disc from a plurality of write strategies, the optical disc containing a characteristic value; the method comprising:
- (a) reading the characteristic value from the optical disc;
- (b) selecting a first write strategy from the write strategies to be an active test write strategy according to the characteristic value of the optical disc;
- (c) writing a test pattern onto the optical disc according to the active test write strategy;
- (d) reading the written test pattern from the optical disc, checking if the written test pattern satisfies a corresponding criterion, and utilizing the active test write strategy to be the preferred write strategy if the written test pattern satisfies the corresponding criterion; and
- (e) before performing step (b), dividing the write strategies into a plurality of write strategy sets according to a plurality of characteristic values corresponding to a plurality of optical discs.

8. The method of claim 7, wherein step (b) comprises selecting a first write strategy set from the write strategy sets to be an active test write strategy set according to the characteristic value of the optical disc, and then selecting the first write strategy from the active test write strategy set to be the active test write strategy.

9. The method of claim 8, wherein if the written test pattern in step (d) does not satisfy the corresponding criterion, step (b) further comprises selecting a second write strategy from the active test write strategy set to be the active test write strategy according to the characteristic value of the optical disc.

10. The method of claim 8, wherein if a test pattern written according to each write strategy of the active test write strategy set does not satisfy a corresponding criterion, step (b) further comprises selecting a second write strategy set from the write strategy sets to be the active test write strategy set according to the characteristic value, and selecting a third write strategy from the active test write strategy set to be the active test write strategy.

11. The method of claim 7, wherein the corresponding criterion corresponds to a bit error rate (BER) being less than a predetermined value or a jitter being less than a predetermined degree.

12. The method of claim 7, further comprising:
- (e) storing the relationship between the preferred write strategy and the characteristic value of the optical disc into a storage unit; and
- (f) using the preferred write strategy for writing data onto another optical disc having a same characteristic value without the need of performing steps (b), (c), and (d).

13. The method of claim 7, wherein the characteristic value records manufacturer information of the optical disc or material information of the optical disc.

14. A recording device for selecting a preferred write strategy for an optical disc from a plurality of write strategies, the optical disc containing at a characteristic value; the recording device comprising:
- a reading/writing circuit for reading the characteristic value from the optical disc; and
- a controller electrically connected to the reading/writing circuit for selecting a first write strategy from the write strategies, which are divided into a plurality of write strategy sets according to a plurality of characteristic values corresponding to a plurality of optical discs, to be an active test write strategy according to the characteristic value of the optical disc, driving the reading/writing circuit to write a test pattern onto the optical disc according to the active test write strategy, and driving the reading/writing circuit to read the written test pattern from the optical disc, wherein the controller checks if the written test pattern satisfies a corresponding criterion, and utilizes the active test write strategy to be the preferred write strategy if the written test pattern satisfies the corresponding criterion.

15. The recording device of claim 14, wherein the controller selects a first write strategy set from the write strategy sets to be an active test write strategy set according to the characteristic value of the optical disc, and then selects the first write strategy from the active test write strategy set to be the active test write strategy.

16. The recording device of claim 15, wherein if the written test pattern does not satisfy the corresponding criterion, the controller further selects a second write strategy from the active test write strategy set to be the active test write strategy according to the characteristic value of the optical disc.

17. The recording device of claim 15, wherein if a test pattern written according to each write strategy of the active test write strategy set does not satisfy a corresponding criterion, the controller further selects a second write strategy set from the write strategy sets to be the active test write strategy set according to the characteristic value, and selects a third write strategy from the active test write strategy set to be the active test write strategy.

18. The recording device of claim 14, wherein the criterion corresponds to a bit error rate (BER) being less than a predetermined value or jitter being less than a predetermined degree.

19. The recording device of claim 14, further comprising a storage unit electrically connected to the controller for storing the relationship between the preferred write strategy and the characteristic value of the optical disc, wherein the controller drives the reading/writing circuit to write data onto another optical disc having a same characteristic value according to the preferred write strategy without selecting a write strategy from the write strategies to be an active test write strategy according to the characteristic value of the another optical disc, driving the reading/writing circuit to write a test pattern onto the another optical disc according to the active test write strategy, driving the reading/writing circuit to read the written test pattern from the another optical disc, and checking if the written test pattern satisfies a corresponding criterion.

20. The recording device of claim 19 being an optical disc drive, wherein the reading/writing circuit is a pick-up head, and the storage unit is a non-volatile memory.

21. The recording device of claim 14, wherein the characteristic value records manufacturer information of the optical disc or material information of the optical disc.

22. A method for selecting a preferred write strategy for an optical disc from a plurality of write strategies, the optical disc containing a characteristic value; the method comprising:
(a) reading the characteristic value from the optical disc;
(b) selecting a first write strategy included in a first write strategy set from the write strategies, which are divided into a plurality of write strategy sets according to a plurality of characteristic values corresponding to a plurality of optical discs, to be an active test write strategy according to the characteristic value of the optical disc;
(c) writing a test pattern onto the optical disc according to the active test write strategy;
(d) reading the written test pattern from the optical disc, checking if the written test pattern satisfies a corresponding criterion, and utilizing the active test write strategy to be the preferred write strategy if the written test pattern satisfies the corresponding criterion; and
(e) storing the relationship between the preferred write strategy and the characteristic value of the optical disc into a storage unit, thereby using the preferred write strategy for writing data onto another optical disc having a same characteristic value without the need of selecting the first write strategy and evaluating the first write strategy.

23. A recording device for selecting a preferred write strategy for an optical disc from a plurality of write strategies, the optical disc containing a characteristic value; the recording device comprising:
a reading/writing circuit for reading the characteristic value from the optical disc;
a controller electrically connected to the reading/writing circuit for selecting a first write strategy included in a first write strategy set of a plurality of write strategy set obtained by dividing the write strategies according to a plurality of characteristic values corresponding to a plurality of optical discs, to be an active test write strategy according to the characteristic value of the optical disc, driving the reading/writing circuit to write a test pattern onto the optical disc according to the active test write strategy, and driving the reading/writing circuit to read the written test pattern from the optical disc, wherein the controller checks if the written test pattern satisfies a corresponding criterion, and utilizes the active test write strategy to be the preferred write strategy if the written test pattern satisfies the corresponding criterion; and a storage unit electrically connected to the controller for storing the relationship between the preferred write strategy and the characteristic value of the optical disc, thereby the recording device uses the preferred write strategy for writing data onto another optical disc having a same characteristic value without the need of selecting the first write strategy and evaluating the first write strategy.

24. A method for selecting a preferred write strategy for an optical disc from a plurality of write strategies, the optical disc containing a characteristic value; the method comprising:
(a) reading the characteristic value from the optical disc;
(b) selecting a first set of write strategies from a plurality of sets of write strategies to be an active test write strategy set according to the characteristic value,
(c) writing a plurality of test patterns onto the optical disc according to the write strategies of the active test write strategy set; and
(d) reading the written test patterns from the optical disc, selecting a substantially optimal written test pattern which satisfies a corresponding criterion from the written test patterns, and utilizing a write strategy corresponding to the substantially optimal written test pattern to be the preferred write strategy;
wherein the plurality of write strategies are divided into the plurality of sets of write strategies according to a plurality of characteristic values corresponding to a plurality of optical discs.

25. The method of claim 24, wherein if each test pattern written according to each write strategy of the active test write strategy set does not satisfy a corresponding criterion, step (b) further comprises selecting a second set of write strategies from the sets of write strategies to be the active test write strategy set according to the characteristic value.

26. The method of claim 24, wherein the corresponding criterion corresponds to a bit error rate (BER) being less than a predetermined value or a jitter being less than a predetermined degree.

27. The method of claim 24, farther comprising:
(e) storing the relationship between the preferred write strategy and the characteristic value of the optical disc into a storage unit; and
(f) using the preferred write strategy for writing data onto another optical disc having a same characteristic value without the need of performing steps (b), (c), and (d).

28. The method of claim 24, wherein the characteristic value records manufacturer information of the optical disc or material information of the optical disc.

29. A recording device for selecting a preferred write strategy for an optical disc from a plurality of write strategies, the optical disc containing a characteristic value; the recording device comprising:
a reading/writing circuit for reading the characteristic value from the optical disc; and
a controller electrically connected to the reading/writing circuit for selecting a first set of write strategies from a plurality of sets of write strategies to be an active test write strategy set according to the characteristic value, driving the reading/writing circuit to write a plurality of test patterns onto the optical disc according to the write strategies of the active test write strategy set, and driving the reading/writing circuit to read the written test patterns from the optical disc, wherein the controller selects a substantially optimal written test pattern which satisfies a corresponding criterion from the written test patterns, and utilizes a write strategy corresponding to the substantially optimal written test pattern to be the preferred write strategy;

wherein the plurality of write strategies are divided into the plurality of sets of write strategies according to a plurality of characteristic values corresponding to a plurality of optical discs.

30. The recording device of claim 29, wherein if each test pattern written according to each write strategy of the active test write strategy set does not satisfy a corresponding criterion, the controller further selects a second set of write strategies from the sets of write strategies to be the active test write strategy set according to the characteristic value.

31. The recording device of claim 29, wherein the criterion corresponds to a bit error rate (BER) being less than a predetermined value or jitter being less than a predetermined degree.

32. The recording device of claim 29, further comprising a storage unit electrically connected to the controller for storing the relationship between the preferred write strategy and the characteristic value of the optical disc, wherein the controller drives the reading/writing circuit to write data onto another optical disc having a same characteristic value according to the preferred write strategy without selecting a set of write strategies from the write strategies to be an active test write strategy set according to the characteristic value of the another optical disc, driving the reading/writing circuit to write a plurality of test patterns onto the another optical disc according to the write strategies of the active test write strategy, driving the reading/writing circuit to read the written test patterns from the another optical disc, and selecting a substantially optimal written test pattern which satisfies a corresponding criterion from the written test patterns.

33. The recording device of claim 32 being an optical disc drive, wherein the reading/writing circuit is a pick-up head, and the storage unit is a non-volatile memory.

34. The recording device of claim 29, wherein the characteristic value records manufacturer information of the optical disc or material information of the optical disc.

35. A method for selecting a preferred write strategy for an optical disc from a plurality of write strategies, the optical disc containing a characteristic value; the method comprising:

(a) reading the characteristic value from the optical disc;

(b) selecting a first set of write strategies from a plurality of sets of write strategies to be an active test write strategy set according to the characteristic value, wherein the plurality of write strategies are divided into the plurality of sets of write strategies according to a plurality of characteristic values corresponding to a plurality of optical discs;

(c) writing a plurality of test patterns onto the optical disc according to write strategies of the active test write strategy set;

(d) reading the written test patterns from the optical disc, selecting a substantially optimal written test pattern which satisfies a corresponding criterion from the written test patterns, and utilizing a write strategy corresponding to a substantially optimal written test pattern to be the preferred write strategy; and (e) storing the relationship between the preferred write strategy and the characteristic value of the optical disc into a storage unit, thereby using the preferred write strategy for writing data onto another optical disc having a same characteristic value without the need of selecting the first set of write strategies and evaluating the first set of write strategies.

36. A recording device for selecting a preferred write strategy for an optical disc from a plurality of write strategies, the optical disc containing a characteristic value; the recording device comprising:

a reading/writing circuit for reading the characteristic value from the optical disc; and a controller electrically connected to the reading/writing circuit for selecting a first set of write strategies from a plurality of sets of write strategies according to the characteristic value, driving the reading/writing circuit to write a plurality of test patterns onto the optical disc according to the write strategies of the active test write strategy set, and driving the reading/writing circuit to read the written test patterns from the optical disc, wherein the controller selects a substantially optimal written test pattern which satisfies a corresponding criterion from the written test patterns, and utilizes a write strategy corresponding to the substantially optimal written test pattern to be the preferred write strategy, wherein the plurality of write strategies are divided into the plurality of sets of write strategies according to a plurality of characteristic values corresponding to a plurality of optical discs; and a storage unit electrically connected to the controller for storing the relationship between the preferred write strategy and the characteristic value of the optical disc, thereby the recording device uses the preferred write strategy for writing data onto another optical disc having a same characteristic value without the need of selecting the first set of write strategies and evaluating the first set of write strategies.

* * * * *